Aug. 11, 1953     L. S. MALOOF     2,648,795
VISUAL ELECTRON FLOW INDICATOR

Filed Aug. 9, 1951     2 Sheets-Sheet 1

Inventor
Leon S. Maloof
by Roberts, Cushman & Grover
Att'ys.

Aug. 11, 1953 — L. S. MALOOF — 2,648,795
VISUAL ELECTRON FLOW INDICATOR
Filed Aug. 9, 1951 — 2 Sheets-Sheet 2

Inventor
Leon S. Maloof
by Roberts, Cushman & Grover
Att'ys.

Patented Aug. 11, 1953

2,648,795

UNITED STATES PATENT OFFICE 2,648,795

VISUAL ELECTRON FLOW INDICATOR

Leon S. Maloof, Watertown, Mass., assignor to Lee Electronic Labs, Inc., Roxbury, Mass., a corporation of Massachusetts Application August 9, 1951, Serial No. 241,107

6 Claims. (Cl. 313—108)

As was described in my copending application Serial No. 211,904 filed February 20, 1951, with the increasing complexity of radar, electronics and communications equipment the problems of quick, efficient service and maintenance become an important factor, and the need of some quick and infallible technique or device to facilitate the service and maintenance of all types of electronic equipment is vital.

In my above mentioned copending application one solution to such problems was to apply to a positively charged electrode of a vacuum tube, a spot of a suitable phosphor in a position in the path of the operational flow of electrons so that the spot glows as an indication of a normal electron current flow through the tube. This solution is not applicable to all types of vacuum tubes as the anode structure of some tubes encloses the cathode so that the portion of the anode in the path of the electron flow is not visible from without the tube. In other types of tubes the electron receiving portion of the anode structure is visible but positioned so near to the cathode that a phosphor applied thereto would be evaporated by the heat radiated from the cathode.

It is accordingly the principal objects of this invention to overcome the above described limitations and provide means whereby it is possible visually to determine whether a vacuum tube is functioning properly while under normal operating conditions.

Other objects are to provide means for testing vacuum tubes which does not require the use of external equipment such as tube checkers, meters or oscilloscopes; which does not alter the electrical characteristics of the associated circuit of the tube being tested, which can be used in the circuits of existing apparatus without alteration, modification or additions thereto; which does not require that the tube being tested be removed from its socket or the associated equipment be shut down; which gives a continuous indication; which does not require any special skill or technique to use; which may be readily incorporated in existing types of electron tubes; which does not increase the interelectrode capacities or alter the normal characteristics of the tube with which it is used; which is safe to use; which is economical to manufacture and which can be produced by mass production techniques.

The invention attains these objects in electron discharge apparatus having within a transparent envelope at least a cathode for emitting an electron flow and an anode with a wall portion facing the cathode, this wall portion having a window in the path of the electron flow, by providing such apparatus with screen means emitting light under electron bombardment and with screen support means on the anode closely adjacent to the window and having a surface which is inclined to the plane of the window wall portion, the screen means being applied to the support means which is disposed to receive electron flow passing through the window.

In another aspect, devices according to the invention comprise a screen supporting surface which has essentially the same area as the window, preserving the electrically effective anode area regardless of anode modification by the window.

In a preferred embodiment, the screen support means consists essentially of the cut-out window portion of the anode wall which portion protrudes louver-shaped outwardly from the window and carries the screen means on its inner surface, whereas, in another embodiment, the screen support means comprises a flange surrounding at least part of the window and the screen means is applied to the inside of this flange.

These and other objects and aspects will be apparent from the following description of several specific embodiments of the invention referring to drawings wherein.

Figure 1:
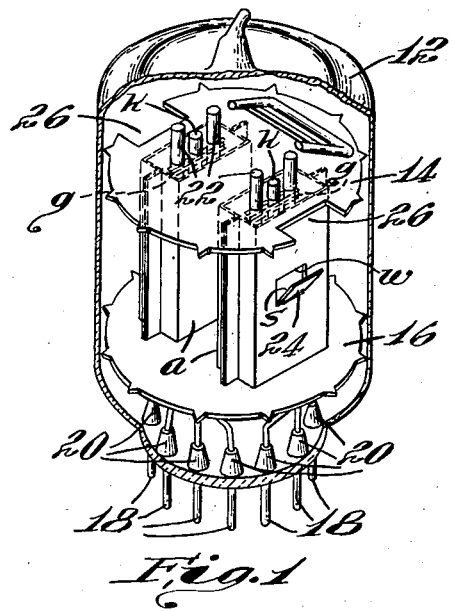
Fig. 1 is an isometric view with portions broken away of one embodiment of the invention.

The electron discharge device shown in Fig. 1 is generally similar to the double triode vacuum tube having the commercial designation 12AU7 having an envelope 12 of a transparent material such as glass. Located within the envelope 12 are two spacers 14 and 16 of mica or other insulating material which act as supports for two essentially identical sets or groups of electrodes which are entirely independent of one another with the exception of common heater connections so that only one set will be described, it being understood that the other set is similar in construction.

Each set of electrodes consists of a cathode $k$ having an emitting surface for example of any of the alkaline earth oxides, well known to those skilled in the art, which copiously emits electrons when raised to a high temperature by means of a heater (not shown) located within the cathode $k$. The ends of the cathode $k$ are supported by the spacers 14 and 16 respectively. Electrical connections between the cathode $k$, its heater and associated external circuits (not shown) are made through pins 18 which pass through seals 20 in the well known manner.

Positioned on either side of the cathode $k$ is a mounting support 22 for the control electrode grid structure $g$. Outside of the grid structure $g$ is arranged an anode structure $a$ which is generally box-like in shape so that electrons flow from the surface of the cathode $k$ through the grid structure $g$ to the inner surface of the anode structure $a$ when the tube electrodes are connected by means of the pins 18 with suitably designed circuits such as are well known in the art.

Located in the outer side of the anode structure $a$ is a window $w$, which in the case of the embodiment shown in Fig. 1 is formed by punching or otherwise bending a tab outwardly to form a louver 24. The inner surface $s$ of the louver 24 has applied thereto a spot of a suitable phosphor such as "Willimite" or other material which will glow or fluoresce under the influence of the electrons from the cathode $k$ which escape through the window $w$.

Figure 6:
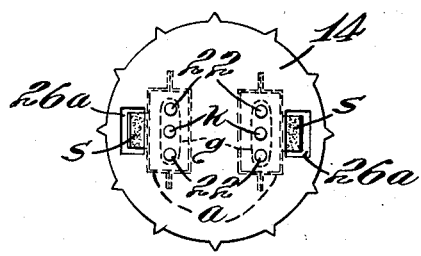
Figs. 6 and 7 show alternate types of insulating spacers for the embodiment shown in Fig. 1.
Figure 7:
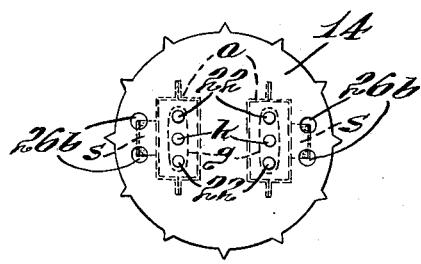

Although in many applications it is preferable to have the phosphored surface $s$ of the louver 24 facing upwardly so that it can be observed from the top of the tube when the tube is enclosed within a shield or the view blocked by adjacent circuit components, it will be understood that the louver can be arranged to be viewed through the side wall of the tube envelope if the configuration of the associated equipment makes such an arrangement more desirable. When the louver 24 is arranged as is shown in Fig. 1, it is necessary that the spacer 14 either be made of clear mica or that openings such as the recesses 26 be provided so that the fluorescence can be observed. Alternatively the openings can be in the form of rectangular apertures 26$a$ such as are shown in Fig. 6 or circular apertures 26$b$ such as are shown in Fig. 7.

Figures 2, 5:
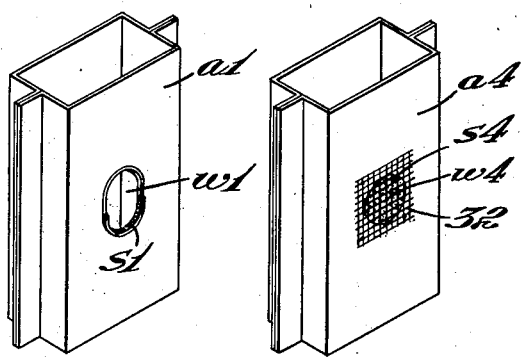
Figs. 2, 3, 4 and 5 show alternate types of anode structures for the embodiment shown in Fig. 1.

In Fig. 2 is shown an anode structure $a1$ for use in the tube shown in Fig. 1, wherein the window $w1$ is either circular or oval in shape having adjacent the bottom portion thereof an internal flange $s1$ whereupon is applied the phosphor material. In the anode structure $a2$ (Fig. 3) the window $w2$ is a circular opening upon the bottom of whose side wall $s2$, which is formed by the thickness of the anode structure material, is applied the phosphor material.

Figures 3, 4:
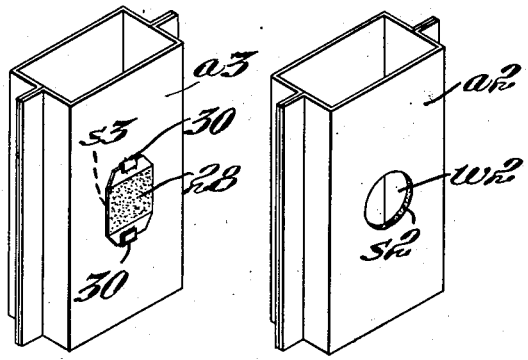

In Fig. 4 the anode structure $a3$ is provided with a rectangular opening which is glazed with a sheet 28 of transparent material, such as clear mica, held in place by means of two tabs 30. The phosphor material is applied to the inner surface $s3$ of the mica sheet 28 where the electrons will impinge thereupon and the glow therefrom can be seen through the sheet. Alternatively a circular window $w4$, such as shown in the anode structure $a4$ (Fig. 5), can be covered by a fine mesh screen 32 which is spot welded to the outer surface of the anode structure. Phosphor material is applied to the screen wires as at $s4$.

Figure 9:
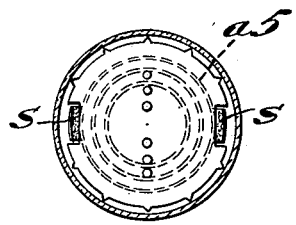
Fig. 9 is a section on line 9—9 of Fig. 8.
Figure 11:
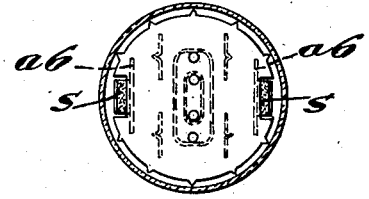
Fig. 11 is a section on line 11—11 of Fig. 10.
Figure 8:
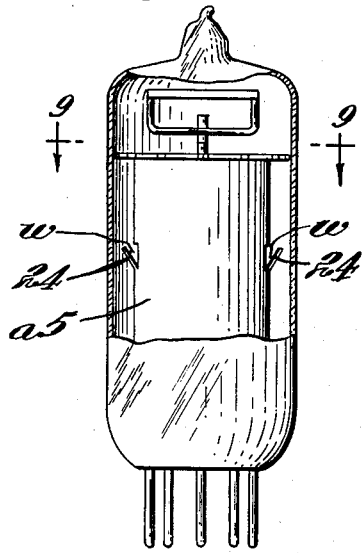
Fig. 8 is an elevation view with portions broken away of a second embodiment.
Figure 10:
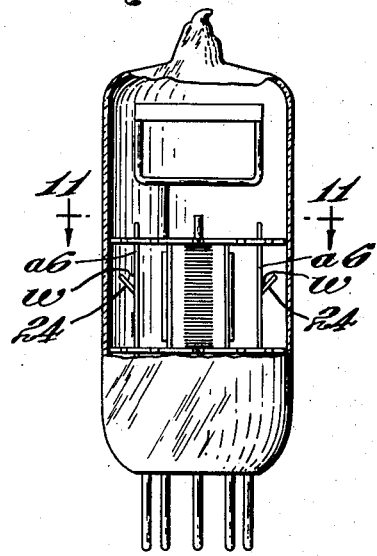
Fig. 10 is an elevation view with portions broken away of a third embodiment.

The scope of this invention is not limited to tubes having a box like anode structure such as that shown in Fig. 1, but includes tubes having a cylindrical anode structure $a5$ such as the type 6BA6 tube shown in Figs. 8 and 9; or a plate type anode structure $a6$ such as the type 6AG5 shown in Figs. 10 and 11. Although louver type of windows $w$ similar to those shown in Fig. 1 are incorporated in the anode structures in the tubes shown in Figs. 8 and 10 respectively, it is to be understood that windows similar to those illustrated in Figs. 2 through 5 or their equivalent may be substituted therefor.

As the presence of the phosphor spots $s$ has been found in no way to effect the performance or characteristics of the tube, it can be used as a replacement for its conventional prototype without any change in the associate circuit. When the tube is operating normally the phosphor spots $s$ fluoresce brilliantly enough so that they can be seen at a distance of several feet in illumination of ordinary intensity so that by observing that the fluorescence is of normal brilliancy a technician can visually determine without the need of any test instrument or tube checker that the following conditions prevail:

(1) The emission of the cathode is sufficient.

(2) The power supply impressing voltage upon the anode is operating satisfactory.

(3) The tube is conducting i. e. the presence of plate current.

(4) Present and relative strength of modulated input carrier signals.

It is thus possible in apparatus such as computers where large numbers of similar tubes are used, quickly to find faulty tubes by observation of the relative brilliancy of the respective phosphor spots in adjacent tubes thus greatly reducing the time required to isolate the tube or circuit wherein the fault is located. The possibility of visual checking the tubes also reduces the chance of obtaining incorrect results due to an undetected failure of some portion of the computor and thus permits the elimination of expensive and complicated auxiliary checking circuits, thereby minimizing the cost of construction.

Tubes incorporating the above described phosphor spots also have application in less complex circuits such as in communication and radar equipment used by the armed forces, airlines and railroads, the continuous functioning of which is a vital matter. In such equipment the technician can determine by the reduction in the brilliancy of the fluorescence of the phosphor spots the tubes in which the emission is reduced without removing the tubes from their sockets thus reducing the maintenance time required for routine checks and eliminating to a great extent the necessity for periodic replacements of all tubes.

Although I have found that for general applications the brilliant green fluorescence of "Willimite" is the most satisfactory color, for special purposes other phosphors having different fluorescing colors can be used to advantage. For example by the use of different phosphors upon the respective anodes $a$, it is possible to determine when the tube is used in a "flip-flop" circuit which half of the tube is conducting. It is also possible to use different phosphors in tubes of the same or other types which are used for different purposes making it possible, for example, for a technician to determine visually the tubes in the high, intermediate and audio frequency stages or having special functions.

It should be understood that the present disclosure is for the purpose of illustration only and that this invention includes all modifications and equivalents which fall within the scope of the appended claims.

I claim:

1. A device for indicating the presence of electron flow in electron discharge apparatus having within a transparent envelope at least a cathode for emitting an electron flow and an anode with a wall portion facing said cathode, said wall portion having a window in the path of said electron flow, and screen means emitting light under electron bombardment, said device comprising screen support means on said anode closely adjacent to said window and having a surface which is inclined to the plane of said wall portion, said screen means being applied to said surface, which surface is disposed to receive electron flow passing through said window.

2. Device according to claim 1 wherein said surface of the supporting means has essentially the same area as the window, preserving the electrically effective anode area regardless of anode modification by the window.

3. Device according to claim 1 wherein said screen means substantially covers the entire area of said surface of said screen support means.

4. Device according to claim 1, wherein said screen support means consists essentially of the cut-out window portion of the anode wall which portion protrudes louver-shaped outwardly from the window and carries said screen means on its inner surface.

5. Device according to claim 1, wherein said screen support means comprises a flange surrounding at least part of said window and said screen means is applied to the inside of the flange.

6. A device for indicating the presence of electron flow in electron discharge apparatus having within a transparent envelope at least a cathode for emitting an electron flow and an anode with a wall portion facing said cathode, said wall portion having a window in the path of said electron flow, and screen means emitting light under electron bombardment, said device comprising a rectangular tab portion cut from said wall portion and bent outwardly from the wall portion, the area from which said tab is cut constituting said window, which tab carries said screen means on the surface which is disposed to receive electron flow passing through said window.

LEON S. MALOOF.

References Cited in the file of this patent

UNITED STATES PATENTS

| Number | Name | Date |
|---|---|---|
| 1,994,726 | Orth | Mar. 19, 1935 |
| 1,994,733 | Thompson | Mar. 19, 1935 |
| 2,304,186 | Litton | Dec. 8, 1942 |
| 2,564,737 | Szegho | Aug. 21, 1951 |
| 2,565,533 | Szegho et al. | Aug. 28, 1951 |
| 2,594,025 | Jacobi et al. | Apr. 22, 1952 |
| 2,594,026 | Jacobi et al. | Apr. 22, 1952 |

OTHER REFERENCES

Kompfner, "The Travelling-Wave Tube as Amplifier at Microwaves," Proceedings of the Institute of Radio Engineers, vol. 35, No. 2, February 1947, pages 124–127.

Varian et al., "A High Frequency Oscillator and Amplifier," Journal of Applied Physics, vol. 10, No. 5, May 1939, pages 321–327.